Sept. 13, 1932.  H. G. SMITH  1,877,071
FILE CUTTING MACHINE
Filed June 23, 1931  2 Sheets-Sheet 1
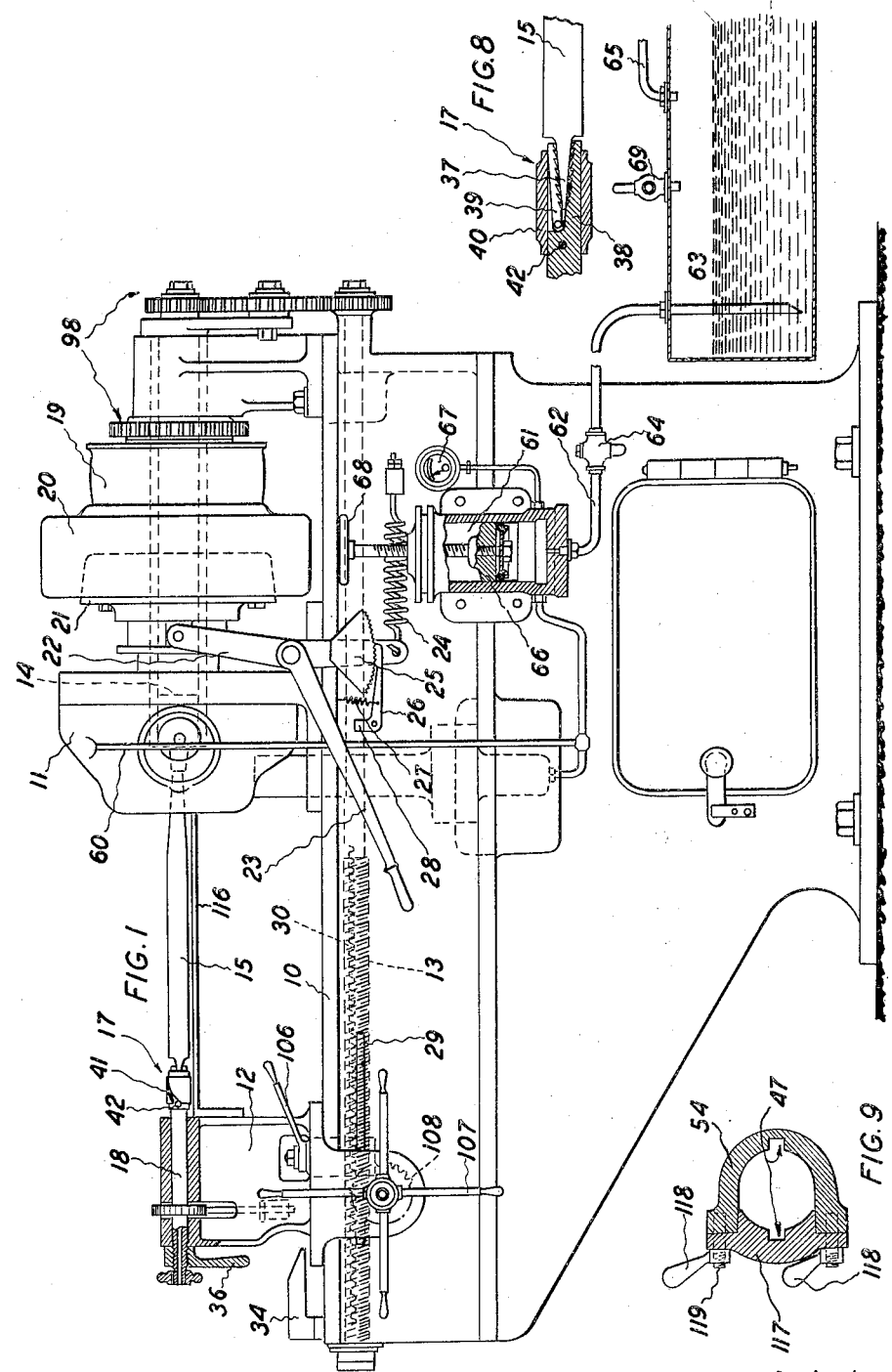
H. G. Smith
INVENTOR
By: Marks & Clerk
Attys.

Sept. 13, 1932.  H. G. SMITH  1,877,071
FILE CUTTING MACHINE
Filed June 23, 1931  2 Sheets-Sheet 2
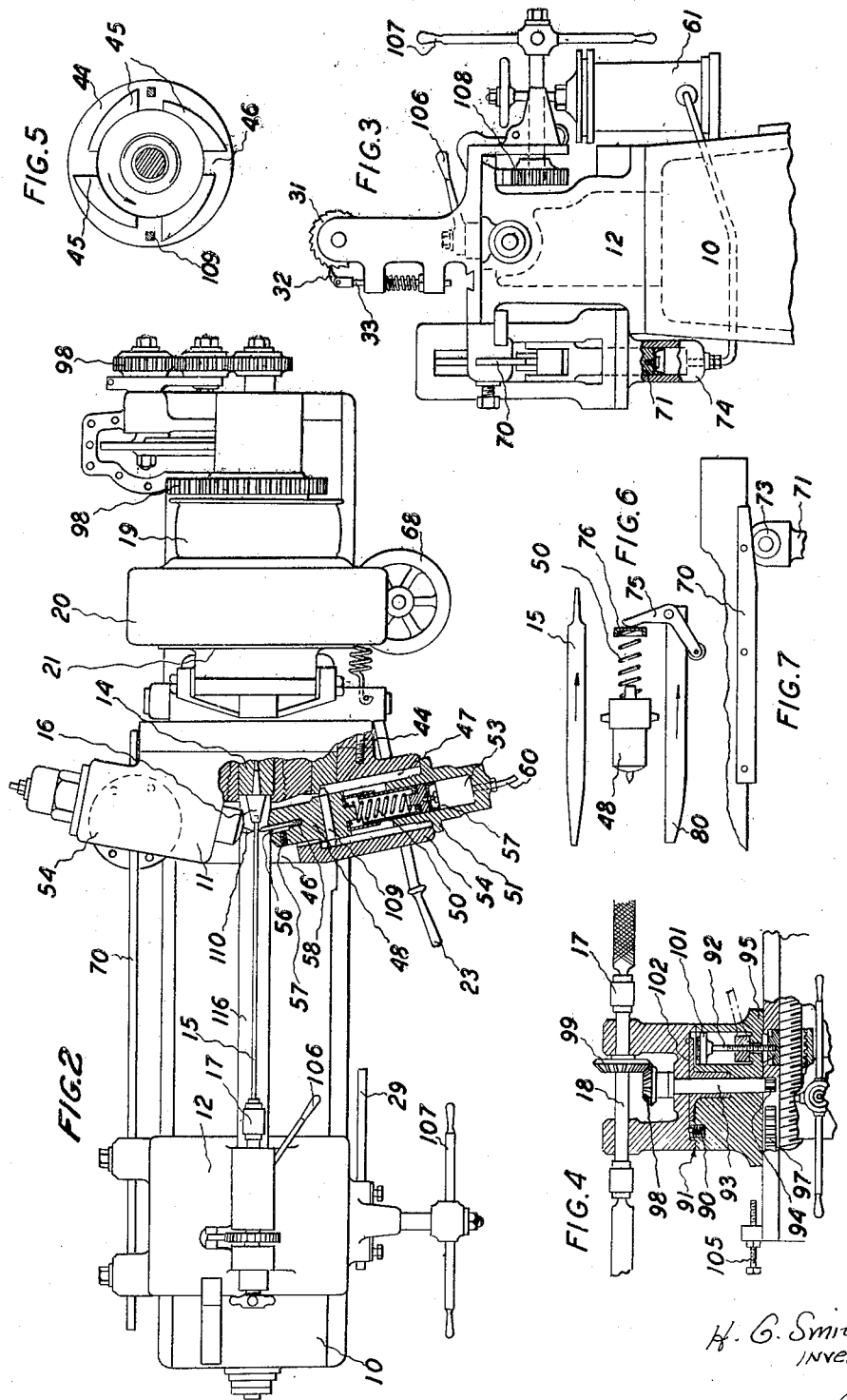
H. G. Smith
INVENTOR
By: Marks & Clerk
ATTYS.

Patented Sept. 13, 1932

1,877,071

UNITED STATES PATENT OFFICE

HARRY GEORGE SMITH, OF KINGS CROSS, NEAR SYDNEY, NEW SOUTH WALES, AUSTRALIA

FILE CUTTING MACHINE

Application filed June 23, 1931, Serial No. 546,383, and in Australia June 26, 1930.

This invention relates to a machine for cutting teeth in steel blanks to produce files, rasps, and hacksaws.

The machine shown in the drawings has been designed for the cutting of flat sided files and will be described subject to certain adaptations required for the cutting of triangular section or round section files. It is usable in the form shown and without substantial modification for the cutting of teeth in rasps and in hacksaw blades and for like purposes.

The machine comprises a bed similar to a lathe bed, a fixed headstock which carries a burring chisel assembly, and a sliding tailstock which is driven by a lead screw. The blanks are held by their tangs in a chuck in the tailstock and by their tips in a socket in a slide spindle in the centre of the headstock. This slide spindle is constrained forwardly by a spring or counterweight which permits it to be driven backwardly as the blank is moved by the tailstock or it is connected to the tailstock by a coupling rod. The chisels in the headstock are reciprocated, striking the opposite faces of the blank simultaneously whilst the blank is being advanced between them. They are carried in plungers; retiring movement is applied to the plungers by cams on a rotating head; striking movement is applied to them by helical springs, and the tension on these springs is adjustable to graduate the striking force thus to vary the depth of toothing in correspondence with the taper of the blank and in relation to the size of toothing required.

In the accompanying drawings:—

Fig. 1 is a side elevation of the machine with certain parts shown in section;

Fig. 2 is a top plan view thereof also having certain parts shown in section;

Fig. 3 is an end elevational view;

Fig. 4 is a fragmentary sectional view of a reversible chuck head provided with two chucks to allow insertion and withdrawal of blanks in one chuck while cutting is in progress on a blank carried in the other chuck and provided with means for automatically changing the angle of presentation of the blanks in relation to the chisel blow direction;

Fig. 5 is a back elevation of the cam assembly;

Fig. 6 is a diagrammatic view of an alternative spring tension controlling device which is mechanically operated, as contra-distinguished from the hydraulic device shown in Fig. 1;

Fig. 7 is a side elevational view of a hydraulic device for varying the spring pressure acting on the plungers;

Fig. 8 is a fragmentary detail view of a chuck with the tang of a file blank held therein; and Fig. 9 is a fragmentary cross section through one of the headstock sockets.

10 is the bed, 11 the headstock, 12 the tailstock and 13 the lead screw. 14 is the socket slide rod; its outer end projects beyond the headstock and is constrained to move inwardly, towards the tailstock, by a weight and pulley (not shown) or it is connected to the tailstock by a coupling bar 116 so as thereby to be moved in correspondence with the tailstock. The file blank 15 is held at the tip of it in a socket 16 set in the inner end of the slide rod 14, and by its tang in a chuck 17 on the end of the tailstock spindle 18. 19 is a belt driving pulley in the head stock assembly; it is attached to the female member 20 of a clutch. The male member 21 of the clutch is movable for engagement with and disengagement from the member 20 by a striker fork 22 on a bell crank lever 23. This lever is provided with a latch for holding it in the position at which the clutch is closed and with a device for automatically releasing this latch when the predetermined length of toothing has been cut in the blank 15. A spring 24 operates to throw the striking lever to pull the clutch open when the latch is disengaged. The latch consists of a detent quadrant 25 and a trip pawl 26 normally held in engagement with it by a spring 27. A heel piece 28 on the pawl is in the path of movement of a push rod 29 which projects from the tailstock. When the end of the push rod 29 presses against the pawl heel 28 the pawl tooth is released from engagement with the quadrant detent 25 and the spring 24 then pulls the clutch open and the drive applied through the clutch to the chisel assembly is arrested. By adjusting the length of the push rod appropriately the position of the last tooth (nearest the tang) which will be cut on the blank is determined.

The tailstock is engaged with the lead screw by a split nut or other usual arrangement which is operated by a hand lever 106, and it is provided with a capstan wheel 107 and pinion (108) arrangement for moving it backward to the starting position. The pinion 108 meshes with a fixed rack 30. The pinion is preferably mounted by a free wheel clutch on the capstan wheel spindle in order that the capstan wheel will not be rotated in the feed movement of the tailstock which is performed by the lead screw.

For the purpose of turning the chuck to set a half round, round, or oval blank at another angular position for recutting along another line at the end of the retiring movement of the tailstock, a detent wheel 31 is keyed on the chuck spindle and a spring retired pawl 32 is fitted in engagement with it. The pawl is carried on a plunger 33 and a ramp 34 is fixed on the bed 10. When the tailstock is being retired the plunger 33 rides up the ramp 34 and moves the pawl through a range corresponding with the rise of the ramp and is thus caused to apply the desired partial rotational movement to the chuck spindle to reset the blank. 36 is a jamb nut lever for locking the chuck spindle after it has been automatically re-adjusted by the ramp and plunger action. This automatic resetting arrangement is not required in the cutting of flat blanks; its utility is in connection with the cutting of teeth in blanks of half round and like section which require several lines of cuts on their curved faces.

The tang 37 of the blank 15 is gripped between a fixed jaw 38 and a hinged jaw 39 in the clutch 17 (see Fig. 8). These jaws are embraced to clamp them on the blank tang by a sleeve 40 which is slotted helically as shown at 41 the slot running on a stud pin 42 fixed in the chuck spindle. Other forms of clutches for holding the blank tangs can be used.

The male member of the clutch is fixed on a short tubular shaft which is fitted with a circular head 44, upon the forward face of which four arcuate cams 45 are fixed. There is a clearance 46 allowed between the neighboring high and low ends of these cams (see Fig. 5).

The fixed part 46 of the headstock 11 carries two oppositely disposed tubular sockets 54. These sockets are radial to the blank carrying socket and they are pitched in accordance with the tooth profile in the direction of the tailstock. They are slotted (47) longitudinally to form guides for the ends of cross pins 109 fixed in chisel carrying plungers 48 and extending beyond the sides of these plungers. Instead of cross pins lug members might be fixed on the plunger sides. These pin ends or lugs are engaged by the peripheral faces of the cams when the cam head 44 is rotated. As the cams run under them they lift them, raising the plungers; when the high ends of the cams pass them the plungers are no longer held up. At this point in the cam movement the plungers are forced inwardly by their springs 50, the pin ends or lugs 109 dropping through the clearance spaces 46; thereafter, the pin ends or lugs are picked up by the following cams and the plungers again raised as before. With four cams fitted as shown, both plungers are raised and dropped simultaneously four times in each rotation of the cam head.

To facilitate withdrawal and replacement of the plungers and other parts from these sockets, the sockets are split longitudinally as shown in Fig. 9 and the caps 117 fixed on by lever handle nuts 118, which engage bolts 119, the split line being disposed in a plane which places the caps and their fastenings in an accessible position.

The back end of each of the plungers is backed by a helical spring 50 contained in a telescopic casing 51 and the outer element of this casing carries a bucket leather piston 52. This telescopic element and the piston are fitted in an hydraulic cylinder 53 which is screwed into the outer end of the socket 54. At the inner end of it each plunger carries a burring chisel 55. These chisels are locked in the plunger ends by wedges 56 and pinching screws 57. A cross slot 58 is provided behind the chisel butt to permit the driving through of a wedge to release the chisel when it is required to remove it for sharpening or replacement.

The tension on the springs 50 and consequently the weight of the blow struck by the chisels is governed by hydraulic pressure in the cylinder 53 acting on the bucket pistons 57. This pressure is regulated automatically. From each of the cylinders 53 a pipe 60 is connected to a control cylinder 61 and this control cylinder is connected by a pipe 62 to an accumulator 63, 64 being a check valve in the pipe 62. The accumulator pressure is raised by a pump which is connected to the accumulator by a pipe 65, and it is maintained at the desired point by means of a releasing valve 69 which releases excess pressure to reduce it to that point by permitting escape of air from the clearance space above the liquid. 67 is a pressure gauge to indicate to the operator the degree of pressure in the cylinder 61 and consequently the pressure acting on the plunger springs. Liquid cannot flow back past the check valve 64. Increase in the pressure in the cylinder 61 above accumulator pressure is procured by depressing the piston 66. This can be accomplished manually by rotating the handwheel 68 to screw down the piston 66.

Automatic variation in the pressure is effected automatically by the arrangement shown in Fig. 7. 70 is a ramp bar which is shaped in correspondence with the pressure variation required during the progress of the cutting of a blank. The accumulator pressure is set at the point of least pressure required, which is when the chisels are operating near the tip of the blank. As the cutting proceeds towards the tang, it is desired to increase the weight of the chisel blows in order to effect deeper cutting. 71 is a plunger operating in a cylinder 74 which is connected to the cylinder 61. The ramp bar 70 projects from the tailstock. As the tailstock moves along the machine bed, the ramp bar running over the anti-friction roller 73 forces down the plunger 71, and the pressure in the cylinder 74, and consequently the pressure in the plunger cylinders 53 is increased above the accumulator pressure to the desired higher point.

It is practicable, however, to effect variation in the striking weight of the chisel plungers by a mechanical device. This mechanical arrangement is shown diagrammatically in Fig. 6. In this case a ramp bar 80 acts on a rocking lever 75 which bears on a shoe 76 behind the spring of each plunger, to vary the spring tension in correspondence with the contour of the ramp.

It will be understood that either the hydraulic pressure varying arrangement or the mechanical pressure varying arrangement may be used, and that the manual control arrangement may be used additionally in either case.

Fig. 4 shows an arrangement for facilitating rapid working of the machine when it is operating on file blanks of circular, half round or oval section. These blanks must be rotated slightly after the completion of each full cut to expose a new line for the next cut, and so on till the cuts cover the whole surface of the blank. It provides also a means for quick removal of cut files from the chucks and quick restarting on other blanks. The portion of the tailstock which carries the chuck spindle 18 is reversible on the carriage portion of it. 90 is an alignment locating spring bullet-latch interposed in the rotational joint 91. By its means it is assured that when the chuck is reversed the spindle will always come to centreing alignment with the socket in the headstock. 92 is the spindle on which is carried the split nut gripper which engages the tailstock to the lead screw; a chuck is fitted on each end of it.

The reversible head of the tail stock is rotatable on a spindle 93. The bottom end of this spindle carries a free wheel pinion 94. When the base of the chuck 95 is slid backward on the bed of the machine by means of the reversing capstan wheel coacting with its rack, the free wheel pinion 94 engages a rack 97 on the bed and partial rotation is thus applied to the spindle 93. When the tail stock is again brought forward by operating the capstan wheel the pinion runs idly on the spindle 93 and the spindle is not rotated; this spindle forms a post upon which the reversible upper portion of the tailstock may be swung round. On the top of the spindle 93 a bevel pinion 98 is keyed, and this pinion meshes with a bevel wheel 99 keyed on the tailstock spindle. Therefore, when the tailstock is run back on the bed, a partial rotation is applied to the tailstock spindle and the blank which is for the time being held in the chuck is turned through a definite angle, thus to expose another line for the cutting. When the tailstock is moved backward to engage the tip of the blank in the socket, the blank remains held at the particular angle to which it has been moved by the partial rotation of the spindle 93. To hold the reversible portion of the tailstock steady on its bed the screw 92 which operates a split nut which grasps the lead screw is fitted with a head 101 armed with a friction pad; this friction pad coacts with a friction disc 102 which is fixed to the underside of the rotatable portion of the tailstock. When the lead screw nut is engaged, the friction pad is forced into tight contact with the friction disc and the tailstock is thus locked so that it cannot be swung accidentally off centre.

The lead screw is driven from the belt pulley 19 through the gear train 98.

When cutting files of half round or other curved section with a flat side two files are placed in the clutch and socket round to round and the clutch and socket are modified appropriately to carry them. The flat faces of the two files are then cut. Then the two half cut blanks are reversed, a paper pad placed between the cut faces and they are reinserted in the chuck and socket and the cutting of the curved faces is then proceeded with, the arrangement shown in Fig. 4 being utilized for moving them angularly to expose successive faces for the cuts. The angle of this adjusting movement effected by the partial rotation of the spindle 93 is determined by adjustment of a stop 105 which limits the backward movement of the tailstock on the bed and therefore determines the degree of movement applied to the spindle by the operation of the free wheel pinion in running over the teeth of the rack.

In the case of hacksaws, several blanks are clamped between cheek plates and the assembly set up between the chuck 17 and the socket 16.

The operation of the machine for cutting of flat file blanks or hacksaw blanks is as follows: A blank having been set up in the manner shown in Fig. 1 is held in the chuck by its tang and in the socket by its tip, and the belt pulley is thrown on, thus bringing the female member 20 of the clutch into rotation. The clutch fork is now moved manually to engage the male member 21 of the clutch, thus to bring the cam head into rotation. As this head rotates, the cams 45 successively engage the ends of the cross pins or lugs 109 which project from the plungers 48, these pins or lugs running in the guides 47 hold the plungers and consequently the tools always in the proper set position. The faces of the cams 45 engaging under these pins or lugs raise the plungers simultaneously compressing their backing springs. When the high ends of the cams pass the plunger pins or lugs, the plungers are no longer supported by them and they are struck forward by the reactive movement of the springs 50 thus driving the tools 110 simultaneously into opposite sides of the file 15. The tension on the springs 50 is determined by the hydraulic pressure in the cylinder 53 and this pressure is regulated by the automatic arrangement shown in Fig. 7 which operates to vary the pressure in the control cylinder 61 which is normally supplied with oil or other appropriate fluid under a predetermined head from the accumulator 63. The weight of the blow struck is thus varied as the cutting proceeds appropriately to the work to be done, the necessary regulation being obtained by appropriately shaping the cam bar 70 which runs over the anti-friction roller on the plunger 71 as the cutting proceeds, and so augments, or if needs be, relaxes, pressure in the control cylinder 61. When the file 15 has been cut for the full length, the stop rod 29 releases the latch 26 which holds the striking lever in the engaged position. Thereupon the lever is reversed automatically by the spring 24. The clutch is then opened and operation of the cam head ceases. During the cutting, the file blank is moved longitudinally as the tailstock is moved along the bed by operation of the lead screw 13. In this movement the file blank pushes the socket carrier 14 which supports the file tip backwardly through its centre bearing in the head. The socket carrier 14 is constrained to move towards the tailstock by means of a weight-pull arrangement acting against the outer end of it or is restrained by a coupling rod which connects it to the tailstock. When the cutting has been completed in the way described, the grip nut which engages the tailstock to the lead screw is released and the tail stock is retired backwards by means of the capstan wheel 107. The tip socket and the carrier rod on the end of it to which it is fitted are caused to follow up by the weight-pull arrangement or by the connector rod, so that ultimately the socket comes to the starting position beyond which it cannot move.

The operation of the machine for cutting teeth in blanks of half-round or like section is performed similarly, subject to mechanical manipulations for turning the blank at the end of each line of cut so as to expose a new face; the details of these modifications of operation will be found in the preceding description.

What I claim as my invention and desire to secure by Letters Patent is:—

1. A machine for cutting files and for like purposes, comprising a chuck adapted for holding one end of a blank, means for applying forward movement continuously to said chuck, opposed plungers disposed radially oppositely in angular relation to the blank, chisel tools carried by said plungers, cam operated means for retiring and releasing said plungers, springs for driving said plungers inwardly to drive said chisel tools simultaneously into opposite sides of the blank at spaced intervals in the forward progression of the blank, hydraulic cylinders and variable piston abutments therein for the plunger springs, and means for supplying liquid under variable compression to said cylinders for varying the tension on said springs.

2. A machine for cutting files and for like purposes, comprising a chuck adapted for holding one end of a blank, means for applying forward movement continuously to said chuck, opposed plungers disposed radially oppositely in angular relation to the blank, chisel tools carried by said plungers, means for retiring and releasing said plungers, said means comprising tappets on said plungers, a rotary head, a symmetrical group of arcuate tangential cams on one side of said head adapted to engage said tappets and lift said plungers, with clearances between the neighbouring ends of said cams adapted to allow said tappets to pass between them in the driving movement of said plungers at the ends of their lift movements, and means for driving said plungers inwardly to drive said chisel tools simultaneously into opposite sides of the blank at spaced intervals in the forward progression of the blank.

3. A file cutting machine comprising a bed, a fixed headstock and a sliding tailstock thereon, a driving clutch in the headstock assembly and a lead screw geared therewith arranged for moving the tailstock towards the headstock, means for engaging and disengaging the clutch, means for releasing the tailstock from the lead screw, a rotatable head associated with the clutch, means for latching the clutch engaged and means for automatically unlatching the clutch holding means when the tailstock has completed its designed movement along the machine bed, a radially disposed assembly of opposed guides in a fixed part of the headstock, plungers housed in said guides, burring chisels on the inner ends of said plungers, means for preventing rotation of the plungers in said guides, tappets on the plungers coacting with interrupted cams fixed on a cam head and arranged for retiring the plungers outwardly, springs in compression behind the outer ends of the plungers adapted for projecting the plungers inwardly when the tappets are released by the cams, and means for supporting the blank in axial alignment with the headstock with one end of the blank held in the tailstock.

4. In combination with a file cutting machine according to claim 3, means including hydraulic cylinders and variable piston abutments therein for the plunger springs and means for supplying liquid under variable compression to said cylinders for varying the tension on said springs.

5. In combination with a file cutting machine according to claim 3, means including hydraulic cylinders and variable piston abutments therein for the plunger springs and means for supplying liquid under variable compression to said cylinders for maintaining tension on said springs, a governor cylinder which is connected with the spring abutment cylinders, a piston in said governor cylinder, and means including a ramp bar associated with the tailstock and coacting with said last named piston for varying the tension on the plunger springs in correspondence with the contour of the ramp bar.

6. In combination with a file cutting machine according to claim 3, means including hydraulic cylinders and piston abutments therein for tensioning the plunger springs, and means for supplying liquid under pressure to said cylinders, said means including an accumulator, a pipe connection from said accumulator to said cylinders, a check valve in said connection, and also in said connection a governor cylinder adapted for augmenting the accumulator pressure and thereby varying the tension on the plunger springs during the operation of the machine.

7. In combination with a file cutting machine of the kind described, a machine bed, a rack on said bed, a free wheel pinion, a tailstock carrying a double end chuck spindle, a vertical rotatable post in said tailstock geared to said spindle, and geared by said free wheel pinion to said rack, and means for applying a partial rotation to said spindle when the tailstock is moved to full back position, thereby to set the spindle so as to hold the blank in the chuck at an appropriate angle for a following cut.

In testimony whereof I affix my signature.

HARRY GEORGE SMITH.